United States Patent
Trummer et al.

(10) Patent No.: US 6,445,193 B1
(45) Date of Patent: Sep. 3, 2002

(54) DISTANCE MEASURING DEVICE AND METHOD FOR DETERMINING A DISTANCE

(75) Inventors: Gunther Trummer, Baiersdorf (DE); Armin Seitz, Dusseldorf (DE); Alfred Neugobauer, Stuttgart (DE); Karl Forster, Commack, NY (US)

(73) Assignees: Mikrowellen-Technologie und Sensoren GmbH, Ottobrunn (DE); Festo AG & Co, Esslingen (DE)

( * ) Notice: Subject to any disclaimer, the term of this patent is extended or adjusted under 35 U.S.C. 154(b) by 0 days.

(21) Appl. No.: 09/581,388

(22) PCT Filed: Dec. 15, 1998

(86) PCT No.: PCT/DE98/03674
§ 371 (c)(1),
(2), (4) Date: Aug. 28, 2000

(87) PCT Pub. No.: WO99/31463
PCT Pub. Date: Jun. 24, 1999

(30) Foreign Application Priority Data

| Dec. 15, 1997 | (DE) | 197 55 648 |
| Mar. 31, 1998 | (DE) | 198 14 448 |
| Jul. 23, 1998 | (DE) | 198 33 220 |

(51) Int. Cl.[7] .................................................. G01R 27/04
(52) U.S. Cl. ............................................................ 324/644
(58) Field of Search ........................... 324/644, 646, 324/637, 76.13, 76.19, 76.23, 76.29, 76.41, 76.43, 76.53; 342/103, 125, 127, 128; 702/60, 76, 124, 150

(56) References Cited

U.S. PATENT DOCUMENTS

| 5,325,095 A | 6/1994 | Vadnais et al. |
| 5,519,326 A | * 5/1996 | Bitar et al. ................. 324/636 |
| 5,596,325 A | 1/1997 | Maas |
| 5,724,041 A | * 3/1998 | Inoue et al. ................. 342/70 |

FOREIGN PATENT DOCUMENTS

WO    WO 93/01470    1/1993

OTHER PUBLICATIONS

Annonymous, "Microwave Piston Position Detection", Research Disclosure, Kenneth Mason Publications Ltd. (Hampshire, England), No. 279, p. 435, (Jul. 20, 1987).

* cited by examiner

Primary Examiner—N. Le
Assistant Examiner—Etienne P LeRoux
(74) Attorney, Agent, or Firm—Jenkins & Wilson, P.A.

(57) ABSTRACT

A distance measuring device is capable of measuring a distance to a piston with a cylinder both discretely and continuously. The distance measuring device includes a coupling probe located axially symmetrically with respect to a piston rod within the cylinder. The coupling probe transmits a continuous wave electromagnetic signal into the cylinder and detects its reflection to measure the distance to the piston while the piston is moving.

22 Claims, 5 Drawing Sheets

DISTANCE MEASURING DEVICE AND METHOD FOR DETERMINING A DISTANCE

The present invention relates to a distance-measuring device and to a method for determining a distance.

Conventional distance-measuring devices are generally employed for detection of the position of the piston in fluidic linear drives and pneumatic or hydraulic cylinders respectively. Said detection in cylinders can take place both discretely, that is at discrete points, as well as continuously during operation.

As a rule, a discrete detection of the position of the piston is used to give feedback of a completed piston-cycle to a control device (e.g. SPS), for example in order to induce another cycle or stage.

For this purpose, one mainly uses sensors sensitive to magnetic fields or sensor devices that detect the magnetic field of a permanent magnet situated on the piston of the cylinder. The sensors are mounted on the outside of the cylindrical pipe of the cylinder. As soon as the piston moves into the measuring range of such a sensor, the latter detects the presence of the piston through the cylindrical pipe. This requires the use of non-ferromagnetic materials, which constrains both the design features and the range of potential applications of the drive.

The detection of other positions of the piston requires the mechanical adjustment of the sensor. For each additional position to be detected another sensor must be installed, which inevitably leads to additional costs for material, assembly, installation, and adjustment.

Furthermore, externally installed sensors require extra space for installation. To ensure accessibility and robustness of the sensor, additional effort in design and construction are necessary.

This type of sensor is predominantly designed as one sensitive to magnetic fields and is commonly known as a Reed-switch, magnetoresistive (MR), giant magnetoresistive (GMR), Hall-switch, or magnet-inductive approximating switch.

The detection of a magnetic field requires adjustment of the magnet to the sensor or the sensor-device. Moreover, this method of measuring restricts the potential applications due to disrupting static and dynamic magnetic fields (EMV, field of a nearby cylinder) as well as due to the thermal reactions of the sensor.

Systems used for the continuous measuring of piston-positions generally operate potentiometrically, according to the LVDT-principle (Linear Variable Differential Transformer), or according to the ultrasound-principle. With such systems, the position of the piston is expressed continuously and most often as an analogous voltage-signal. In addition to those systems there are also methods of incremental distance-measurement. The latter may, for example, put codes on the piston rod and are therefore only capable of measuring relative distances.

The continuous as well as the discrete detection of the piston position often cannot be integrated into the cylinder. Even where this is possible, the procedure leads to considerable constructional and financial expenditure. This is due to the fact that the measuring range of all above-mentioned conventional sensor mechanisms is too limited and therefore requires constant adjustment to the length of the respective cylinder.

It is the task of the present invention to develop a distance-measuring device and a method for determining a distance capable of overcoming the disadvantages described above. The device and method shall allow for the continuous and discrete measuring of distances, they shall be easy to operate, and they shall be fit for a wide variety of applications.

This invention provides a distance-measuring device and a method to determine distances, in which a sensor arrangement includes a coupling probe. This probe measures a specific distance, for example in a cylinder, through the emission and reception of (sound) waves, for example by integrating the coupling probe into the cylinder. The integration of this coupling probe into the cylinder makes it possible for the distance measuring device to be built small, and requires little or no alteration to the device. Because there is no need for a mounting for external sensor devices, the entire setup of the proposed distance-measuring device can have a clean, level design, and the external appearance is not altered. Installation costs are decreased in the proposed device, because the prefabricated cylinder has only a connecting cable for control and data acquisition. Furthermore, this allows for the separation of the sensor device from the control and evaluation electronics. The latter can be operated externally and remotely from the distance-measuring device that controls the coupling-probe. Usage in a high-temperature environment is possible, in particular between the range of 300 and 1000 degrees Celsius, without problems. According to the proposed method, the length of a circuit is measured up until a short-circuit device, which where appropriate can be adjusted. The transmission signal of the intended distance-measuring device is transmitted into the circuit, and is reflected by a specific section of the circuit, preferably a short-circuit device. Thus the distance between the introductory point and a specific section of the circuit is measured. The distance is measured by determining the transit-time of the signal.

When using a frequency-modulated transmission signal, the distance is calculated using the following formula:

$$\text{Distance} = n \times (C/2) \times (\text{frequency deviation})$$

where $n = 1, 2, 3 \ldots$
and $C = $ speed of light

This method of measuring the distance achieves a rate of accuracy of a half-wavelength of the transmission signal. A procedure to measure the distance carried out in this manner, measuring the distance to a specific section of the circuit, is referred to herein as a "search process."

Further advantageous designs of the proposed device are the subject of the dependent claims. For example if a coupling probe allows a magnetic or electric coupling, and/or a slot coupling, then the cylinder functions as a wave-guide and/or a coaxial lead.

Depending on the desired mode, the coupling probe emits an electromagnetic wave in high-frequency range, preferably between 10 MHz and 25 GHz, into the cylinder, in order to provide the best possible signal processing. Depending on the dimensions and/or size of the cylinder, frequencies in the lower range can be used, after which the next-highest mode is diffusible. Practice shows that, particularly with regard to a piston, single-mode diffusion is advantageous, preferably in TEM-mode. In this mode the TE11-field-type is promoted as the next-highest mode.

The resulting frequency ranges for cylinders with a diameter D and the piston-rod with diameter d, where D=10 mm and d=4 mm, are approximately 14 GHz for a frequency in the lower range of the TE11 Mode, and where D=25 mm and d=10 mm, approximately 5.5 GHz for a frequency in the lower range of the TE11 Mode.

It should be noted in this context, that in a piston-cylinder, the TE11 Mode is suppressed by the straight symmetry of the axis of the field-excitation/stimulation as well as of the field-space. The width of the frequency range, in which next-higher field types are diffusible, can be almost doubled due to this axial-symmetry. In this example, the next-higher diffusible mode is the TE21 Mode. However, it should be noted that in cylinders with a straight piston rod, apart from field-types of the coaxial lead, field-types in the circular waveguide exist as well. For all cylinders, the frequency range of this field type in a circular waveguide is higher than the respective frequency range of the field type in cylindrical coaxial lead. If, for example, one uses an operating frequency that allows only for the diffusion of the TEM field type in the coaxial lead, no other field types of the waveguide are diffusible in the entire cylinder.

If, the coupling is singular, therefore non-symmetrical, the TE11 Mode is diffusible in a coaxial cylinder. If, however, multiple introductory points with axially-symmetric couplings are used, the TE11 Mode is suppressed in a coaxial cylinder. In this case, if two coupling probes transposed at 180 degrees are used, both probes are supplied through an introductory point by splitting the HF-signal through a 3 dB-power coupler or a power divider, e.g. Wilkinson. For four coupling probes in 90-degree transposition two 3 dB-couplers are used; eight coupling probes in 45-degree transposition require four 3 dB-couplers. The advantage of axially-symmetric introduction consists in the suppression of the next-higher mode, which allows for the use of a higher transmission frequency. This higher transmission frequency and the resulting greater bandwidth achieve increased accuracy in measuring.

Creating a measuring-device that contains a matching network, preferably a high-frequency network, is favorable because it increases the frequency range of the probe. This makes possible the emission and reception of a frequency-modulated transmission signal. Such a matching network is a prerequisite for determining a distance through the "search process" and the corresponding search-algorithm most accurately. Preferably, both the coupling probe and the matching network should be designed as passive power structures in the form of a thin layer of gold (e.g. 15 mm), preferably produced by galvanization. For practical reasons one might favor a coupling that is singular, non-symmetric to the axis and thus forfeit the advantages of a symmetric coupling, namely a higher transmission frequency and a greater accuracy of measuring. This makes it possible to work with an identical probe for almost all commonly used types of circuits, in particular all sizes of piston-cylinders.

The symmetrical coupling with several coupling probes has another advantage: the transmitter and the receiver can be connected to separate antennas. To achieve this when using, for example, four coupling probes, one should use two probes situated opposite from one another for each the transmission and the reception. If the transmission branch and the reception branch are not separated both the coupling probe and the circuit of the transmitter are used for the receiver until separated by the link-up. The coupling probe includes an insertion damper. Consequently, a part of the transmission signal is reflected at the coupling probe and enters the receiver. Inside the receiver, the reflected part of the transmission signal overlaps with the actual reception signal and reduces the accuracy of the measurement. Separating the transmission branch from the reception branch at the antenna will avoid this problem.

The separation of transmission antenna and reception antenna has another advantage: different designs can be used as transmission- or reception antenna, e.g. electric or magnetic probes or a slot coupling. Combinations of those designs are also possible. This allows for a direct feedback of the transmission signal into the receiver and for an improvement of the quality of the signal.

If, one uses the high-frequency electronics of the sensor device (split up into a transmission branch and a reception branch), the reception branch of which consists of a mixer and/or at least four high-frequency diodes, then it is possible to detect the direction of the movement of a predetermined part of the circuit and to clearly determine a distance change of this part.

If a closed control loop is implemented a frequency, e.g. of the Voltage Controlled Oscillator (VCO), which, for example, has been diverted from the transmission branch, cannot be used directly as the final quantity. Instead, this quantity can be used in frequency and phase control. This method makes possible a direct, simplified and particularly quick processing and interpretation of the signals to determine the distance.

This dynamic frequency-regulation can be controlled through a Phase-Lock-Loop (PLL), which consists of at least one frequency divider, one phase discriminator and one low-pass filter. In this case, the index-frequency is predetermined by a Direct-Digital-Synthesizer.

If the reception branch contains an IQ detector (In-Phase/Quadrature Detector), this special design makes possible the detection of the direction of a movement of a predetermined part of the circuit.

Another advantageous, simplified design for the Search Mode is created when the frequency deviation of the oscillator and the length of the delay line are chosen to correspond with a specific, predetermined distance between the coupling probe and a section of the circuit, e.g. in a piston. This means that a synchronization point within the circuit is predetermined. When the synchronization point is crossed by a piston rod, for example, then the transmitter synchronizes immediately, it switches to the Track-Mode and takes over the highly dynamic detection of the piston position.

Furthermore, if a synchronization point is chosen relatively remote from the coupling probe, the procedure described above offers the advantage that the delay-line can be kept short, e.g. as a printed lead on the backside of the coupling probe. Moreover, the frequency deviation can be kept small.

The procedure has another advantage: choosing a point of synchronization relatively remote from the coupling probe makes it possible to keep the delay line short (e.g. applied to the backside of the coupling probe), and to keep the frequency deviation low.

Further advantageous designs are subject of the remaining dependent claims.

In reference to the enclosed diagram, a preferred design option for application of the present invention in a piston-cylinder is illustrated.

Figure 1:
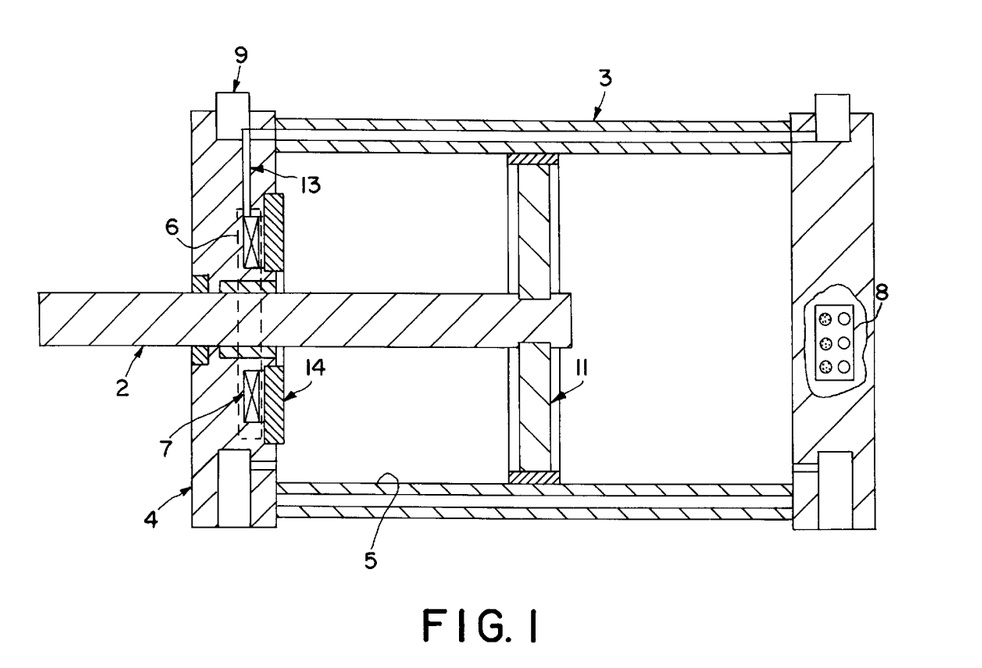
FIG. 1 shows a lateral sectional view of the integration of the distance measuring device into a piston cylinder according to an embodiment of the present invention.

FIG. 1 shows a possible application of the proposed distance-measuring device, which can be used in a piston-rod cylinder run by a linear drive either hydraulically or pneumatically. A sensor arrangement 6 is situated axial-symmetrically to piston rod 2 in a bearing cap 4 for the piston rod 2. As can be seen in FIG. 1, this design is defined by the piston-rod 2, the piston 11, a cylinder wall 3, and the bearing cap 4. A coupling probe 7, which is part of the sensor device 6, is integrated into the bearing cap 4 and is directed at the circuit 5. Additionally, there are conduits 13 integrated into the bearing cap 4 for the power supply wiring of the sensor arrangement. Those conduits end in a plug-in connection 9 on the periphery of the bearing cap 4.

There are many possible designs for the cylindrical pipe and the piston rod cylinder itself. However, it is important to provide for some form of circuit 5 that allows for the reflection of the transmission signal. In the design shown in FIG. 1, the reflection is made possible by the piston 11, which also acts as a short-circuit device. To protect the sensory-device and/or the coupling probe 7 from damage, an internal buffer 14 could absorb the impingement of the piston 11 on the bearing cap 4. Moreover, both a control element and a display 8 can be integrated into the cap 4, indicating the individual switch-points and making possible tuning.

Figure 2:
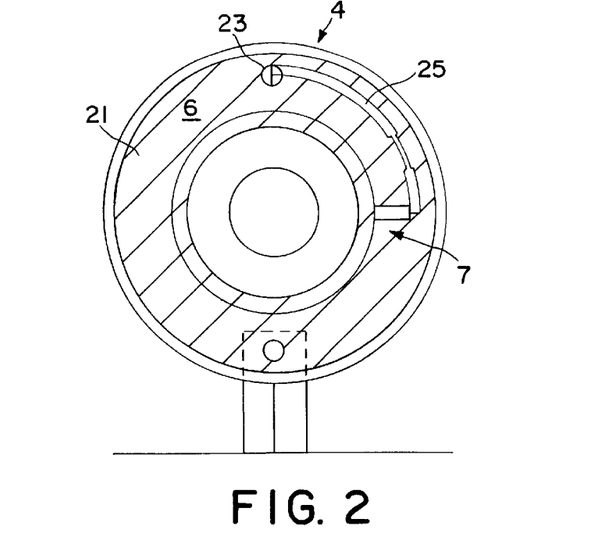
FIG. 2 shows the frontal view of the proposed distance-measuring device according to an embodiment of the present invention.

FIG. 2 shows a frontal view of the bearing cap 4. It shows the sensor arrangement 6 contained in the proposed distance-measuring device. The design shown in FIG. 2 has been developed for the use with a circular piston. The sensor arrangement 6 includes a ceramic disc 21, which has the coupling probe 7 on its front side. The back side of the ceramic disc 21 serves as a carrier for the electronics elements. The transmitter-receiver lead and the coupling probe 7 are connected preferably through a galvanic coupling or an aperture coupling.

To be able to tune a larger frequency range, a matching network 25 was included. The matching network is situated between the introductory point, which is predetermined by the contact 23, and the coupling probe 7.

Figure 3:
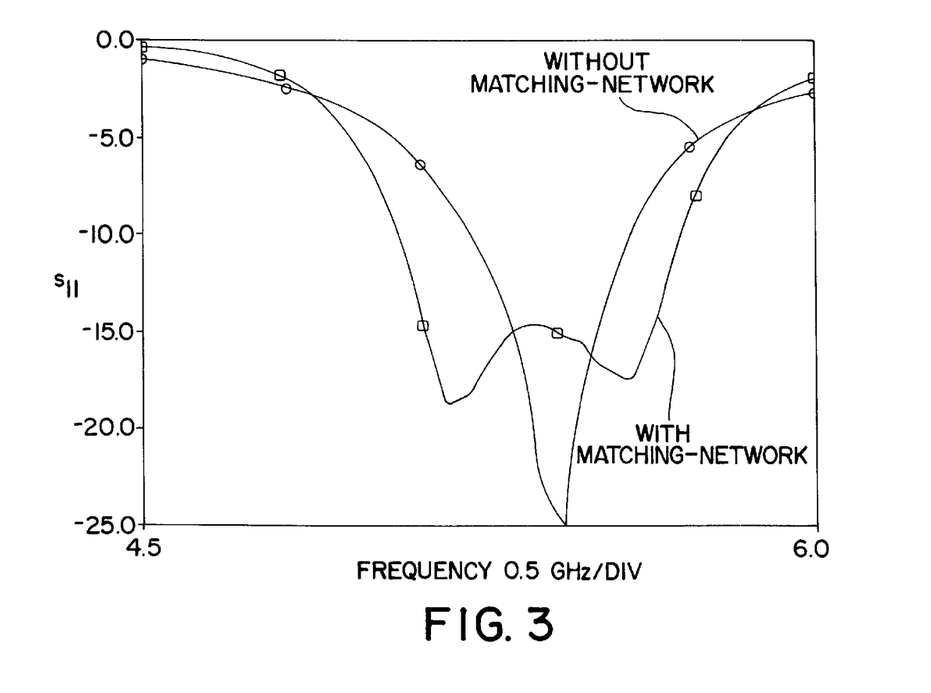
FIG. 3 shows a frequency-distribution curve with and without a matching-network according to one possible design of the present invention.

FIG. 3 shows the potential influence matching network 25 can have on a frequency distribution. It is obvious that matching network 25 doubles the range of frequencies that can be tuned, e.g. the half-width. At this point it should be noted that the ceramic disc 21 does not necessarily have to extend around the piston-rod. It may also consist of a small, circular substrate, which is attached non-symmetrically to a section of the piston. Generally, the coupling probe may also consist of several, e.g. two, contacts and a piece of printed line on the front side of the substrate. The lead connects the two contacts.

The simplest design of magnetic coupling probe 7 consists of a piece of coaxial lead; for higher frequencies a so-called semi-rigid lead is preferable. The coaxial lead is run mechanically through the bearing cap. The open internal-lead forms a small loop and is dissolved at the bearing cap and therefore short-circuited.

Similar to the electric probe, the magnetic probe can be designed as a printed strip conductor. In this case, the wiring is run around the piston-rods star-shaped from the inside out. The contact wiring connects the electronics elements on the backside of the substrate with the printed strip conductor on the front side. The contact 23 is at the internal end of the printed strip conductor, at the external end the lead is connected to the cylinder casing. Further designs, e.g. including a slot coupling, are conceivable. Other than that, all possible variations can be used, with regard to the coaxial symmetry, like the electric coupling probe.

Figure 4:
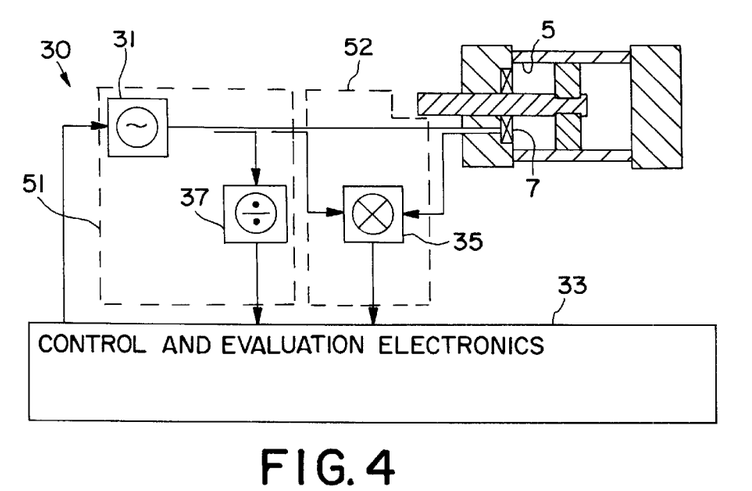
FIG. 4 shows a block diagram of the high-frequency electronic system with a first reception branch for measuring the distance according to an embodiment of the present invention.

FIG. 4 shows high-frequency electronics 30 and control and evaluation electronics 33. As can be seen, the coupling probe 7 is controlled by an oscillator 31, preferably a voltage-controlled oscillator (VCO.) Here, the predetermined voltage is created by the control and evaluation electronics 33 through an ascent-control.

The transmission signal is introduced into the circuit through a magnetic or an electric coupling probe 7. First, one measures the absolute distance between the absolute introductory point and the piston. To do this, the time delay of the transmission signal is measured and processed. The result is a correlation according to Equation 1.

The frequency of the received transmission signal is lowered in mixer 35. Subsequently, processing this signal provides the absolute distance between the introductory point and the position of the piston or a predetermined section of the circuit with an accuracy of the half-wavelength of the transmission signal. This procedure can be called seek-method. After the position of the piston has been determined with sufficient accuracy, one switches to the so-called Track-Mode. A continuous wave signal is coupled into the cylinder. As a result of the coupling, a static wave forms. This static wave shifts with the movement of the piston. The shift can be measured by processing the phases of the signal, the frequency of which has been lowered. This method makes it possible to determine the distance to the piston with accuracy in the sub-millimeter range.

Generally the high-frequency electronics 30 are divided into a transmission branch 51 and a receiver branch 52. As shown in FIG. 4, the high-frequency electronics 30 consist of a voltage-controlled oscillator 31 (VCO) and one or more (frequency) dividers 37. The frequency of the oscillator 31 is tuned to a value of, for example, between 4 and 6 GHz, through the predetermined voltage of a Varactor-diode. Part of the energy is resistively extracted from the transmission branch 51 and shunt through a frequency divider 37, e.g. to 30 MHz, so that the transmission frequency is known at all times. The receiver branch 52 consists of a mixer 35, which transforms the signal by mixing it with a transmission signal in the frequency range of up to a few kHz-signals. Since only a continuous wave signal is sent during the Track-Phase, the mixer 35 has to be a DC-coupled one.

Figure 5A:
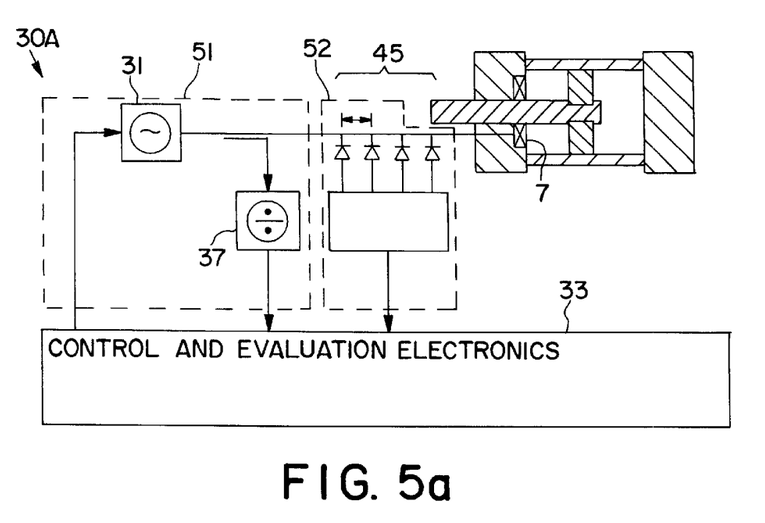
FIG. 5a shows another possible design of a high-frequency electronic system used to detect the direction of a predetermined, moving part within the circuit according to an embodiment of the present invention.

In FIG. 5a, high-frequency electronics 30A include an arrangement of detector-diodes replaces the mixer 35 shown in FIG. 4. In order to detect the direction of the piston, as well as to clearly determine the changing distance of the piston by the shift of the static wave, one must use at least four detector-diodes. The distance between the individual diodes derives from the following Equation 2:

$$\text{Distance} = n \times (\text{wavelength}/2) + (\text{wavelength}/16)$$

Where n=1, 2, ...

There are two separate phases to the processing of the signal. After turning on the sensor or after a malfunction, e.g. due to a voltage drop, the distance to the cylinder-piston or a predetermined section of the circuit is measured in the so-called Search-Mode.

To do this, the frequency of the oscillator 31 is modulated, e.g. within a bandwidth of 15 GHz. The distance of the coupling probe 7 to the cylinder-piston can be determined by calculating a FFT (Fast-Fourier-Transformation) and by subsequently calculating the DFT (Discrete-Fourier-Transformation) of the video-signal. This method is accurate to the half-wavelength. Other methods are a simple zero-coefficient count or a minimum-count or a maximum-count.

The following equation applies:

Length of the cylinder=n×(Speed of Light/2)×frequency deviation

This equation shows that if the internal length of the cylinder were 0 (the piston is at the introductory point) an indefinitely big frequency deviation would be required. Therefore a 50 W delay line is needed between the receiver and the introductory point. The length of the delay line limits the necessary frequency deviation, even with the piston at the introductory point, to a practicable magnitude of, for example, 20% of the transmission frequency.

In the simplest design shown in FIG. 4, the frequency of the VCO 31 is controlled through a micro-controller or through a discrete electronics system. To achieve this, a part of the transmission signal is extracted from the transmission branch 51, for example resistively. Optionally, the frequency of the transmission signal can be reduced by at least frequency divider 37 to a degree that makes it possible to determine the resulting frequency by using a simple frequency counter. Subsequently, the deviation between the actual frequency and the desired frequency of the oscillator 31 is regulated by changing the predetermined voltage at the oscillator 31. In this design, the specific voltage is displayed through a digital/analog transformation. This procedure for determining the frequency-adjustment is called "static frequency-adjustment."

Figure 5B:
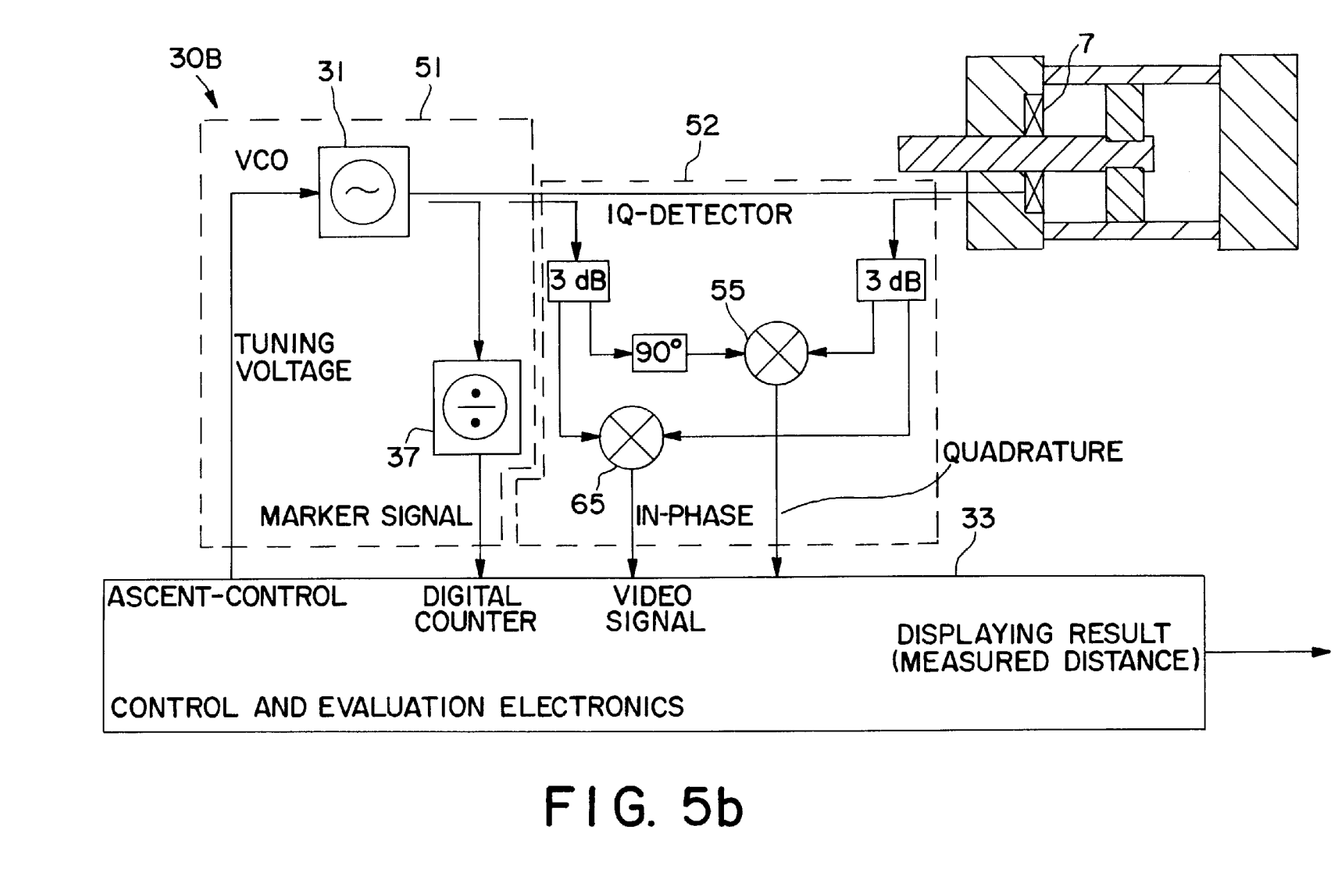
FIG. 5b shows another possible design of a high-frequency electronic system used to detect the direction of a predetermined, moving part within the circuit according to an embodiment of the present invention.

FIG. 5b shows another possible method to determine a distance and to detect a direction at the same time. In FIG. 5b, high frequency electronics 30B include an In-Phase/Quadrature (IQ) detector used as a receiver instead of the mixer 35 (shown in FIG. 4) and an arrangement of detector-diodes 45 (shown in FIG. 5a.) The IQ detector consists of two mixers 55 and 65. The local oscillators of these mixers show a phase-misalignment of 90°. Consequently, this results in two reception-signals, inphase (sine value) and quadrature (cosine value.) The correlation of the two makes it possible to distinguish the forward-movement of the piston from the reverse-movement of the piston (detecting a direction.) This procedure is used preferably in the Track-Mode when a continuous wave signal (at one frequency) is being transmitted. The 90° difference in the lead-length between the two local oscillators is binding only at a stable transmission frequency. This frequency, then, must also be used in the Track-Mode.

Figure 6:
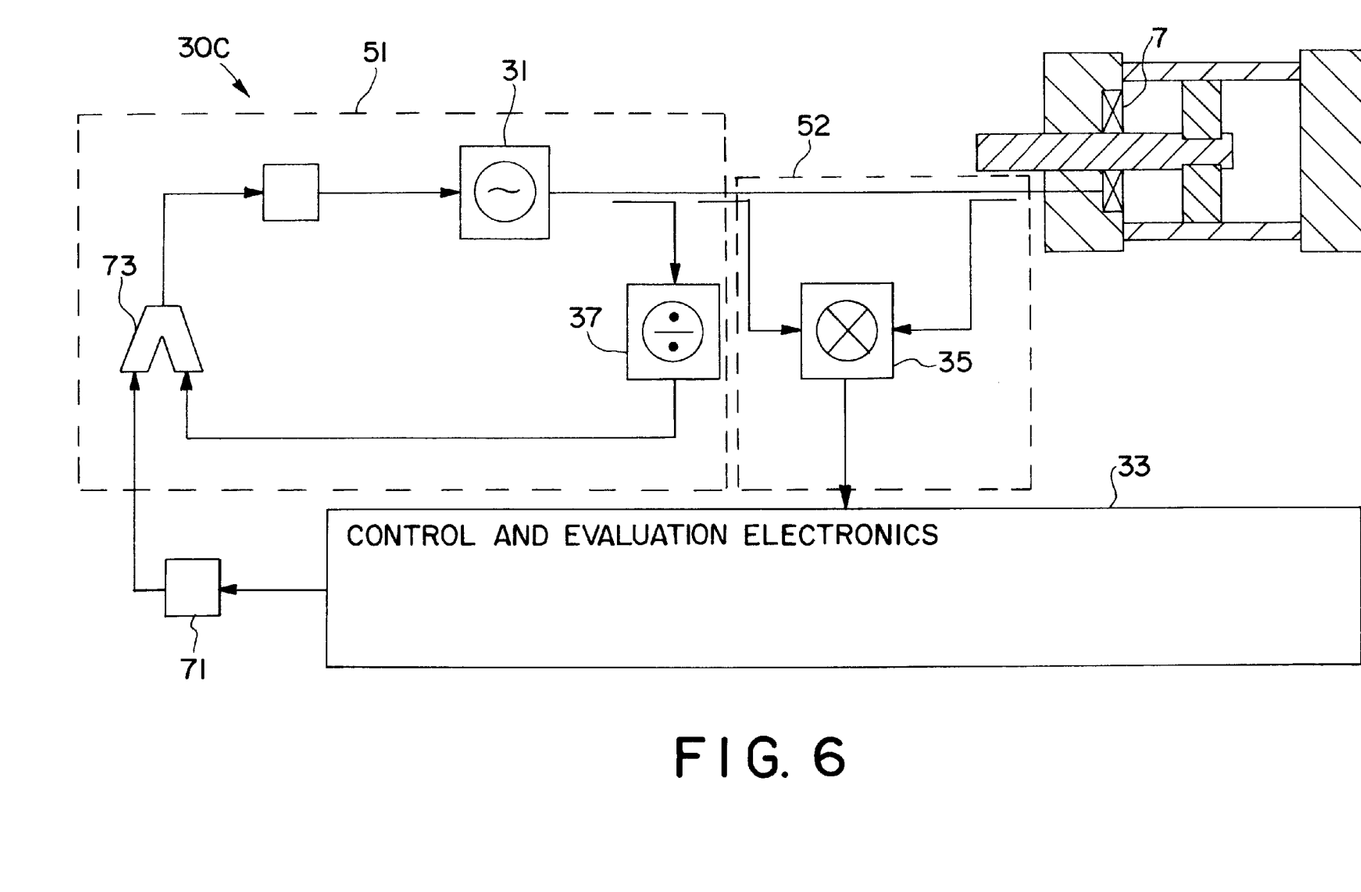
FIG. 6 shows another possible design of a high-frequency electronic system used to measure the distance according to an embodiment of the present invention.

FIG. 6 shows high frequency electronics 30C capable of a dynamic frequency-adjustment. The main difference to the other design is that the VCO-frequency, which has been diverted by the frequency-divider 37, does not constitute the total quantity. Instead, it is used in a frequency- and phase control and forms a loop. A direct digital synthesizer (DDS) 71 is tuned to a specific frequency by, for example, a micro-controller. As a reference variable, this frequency passes into the loop through a phase discriminator. The phase discriminator 73 distinguishes/splits the signal coming from the digital synthesizer 71 from the diverted frequency signal. After the absolute distance has been determined by using one of the designs mentioned earlier, the sensor switches to the Track-Mode. This not only increases the accuracy of the measuring but also makes possible the highly dynamic tracking of the piston in operation.

In the Track-Mode a continuous wave signal is transmitted. A static wave forms in the cylinder. The change of the wave in the receiver can be evaluated/processed by the connected electronics system after its frequency has been lowered to the base-band, e.g. from 0 kHz to 100 kHz, by the IQ-detector described earlier, or an arrangement of detector-diodes 45, or a mixer 35.

One may choose a transmission frequency so low in the Track-Mode that the half-wavelength nearly equals the maximum length of the cylinder. In this case, the distance can be determined by a simple CW measuring. Here, the Search-Mode is not necessary.

This procedure is particularly advantageous when used in long-stroke cylinders. It becomes problematic when one deals with a large number of cylinders of different sizes while choosing to maintain he same transmission frequency for all the types of cylinder (universally applicable sensors.) To make it possible to clearly measure the distance, a transmission frequency has to be chosen that is adequate for the longest cylinder. Consequently, the measuring process becomes very inaccurate for very small cylinders.

The described micro-controller and the design of the cylinder allow for a large variety of possible electrical and mechanical models, as well as for the implementation of additional functions.

For example, the arrangement of electric connections can be places at any spot on the stationary parts of the cylinder. In this case, the internal supply takes place through special conduits in the profile of the casing. The same is applicable for a controller-interface that is partly needed for the display and regulation of the circuitry of the cylinder. This interface may consist of LEC, LCD displays. It allows for the tuning of connections by Teach-In buttons/keys or a potentiometer.

Furthermore, this interface can be located remotely from the cylinder. This improves the accessibility.

In contrast to the current state of technology, the sensor-system used in the distance-measuring device enables additional functions. These include free configuration of outlets, additional direct over further components, e.g. connected valves or regulators, as well as a bus connection node. 'Free configuration of outlets' means that, for example, each circuit outlet can be modified as a failure message, for the external detection of broken cable, as a service-interval display, or as an analog-outlet freely definable characteristic.

The electric connection should preferably be plug-in connection. Here, an additional, modulated, bi-directional communication signal can be superimposed on the voltage-supply leads. This allows for a parameterization or an arrangement with external devices without further effort. Apart from this design one can conceive of a pure bus connection system. Ideally, this system should already be integrated through the pneumatic connections. Moreover, the wireless transmission of signals is possible.

A remote, i.e. not integrated, processing system increases the applicability of the device significantly, particularly in the high- and low-temperature range. Strip conductors or high-frequency coaxial leads connect the coupling probe with the processing system. Consequently, there are no more active electronic components on or inside the cylinder; the device can be used easily in the high-temperature range.

The proposed corresponding method for measuring a distance has another advantage in the field of volume measuring, in particular with regard to separating layers. If there are several liquids with different dielectric constants within the circuit, e.g. the diving tube of a tank, the border layer between the liquids can be determined easily.

For example, this method can be used frequently in oil tanks. Over time, condensed water forms on the bottom of the tank. It has to be removed without having to empty the tank. The oil (dielectric constant=ca. 2 to 10) is floating on the surface of the water (dielectric constant=ca. 88.)

What is claimed is:

1. A distance-measuring device comprising: a conductive cylinder; a reflection means movably mounted within the cylinder for reflecting electromagnetic waves; a rod coupled to the reflection means for controlling movement of the reflection means; a sensor arrangement including a coupling probe located axially symmetrically with respect to the rod within the cylinder for feeding a continuous wave electromagnetic signal into the cylinder and for detecting a reflection of the continuous wave electromagnetic signal from the reflection means within the cylinder; high-frequency electronics coupled to the coupling probe for generating the continuous wave electromagnetic signal and receiving its reflection; and control and evaluation electronics coupled to the high frequency electronics for continuously determining the distance while the reflection means is moving based on the reflection.

2. The distance-measuring device according claim 1, wherein the continuous wave electromagnetic signal has a frequency located in a range from 10 MHz to 25 GHz.

3. The distance-measuring device according to claim 2, wherein the continuous wave electromagnetic signal comprises a single mode TEM wave for a coaxial cable.

4. The distance-measuring device according to claim 1, wherein the coupling probe comprises a single structure for transmitting the continuous wave electromagnetic signal and for detecting the reflection.

5. The distance-measuring device according to claim 1 comprising a matching network coupled to the coupling probe for increasing the frequency range of the continuous wave electromagnetic signal.

6. The distance-measuring device according to claim 1 wherein the high frequency electronics include a transmitting branch for generating the continuous wave electromagnetic signal and a receiving branch for receiving the reflection of the continuous wave electromagnetic signal.

7. The distance-measuring device according to claim 6 wherein the transmission branch includes an oscillator for generating the continuous wave electromagnetic signal.

8. The distance-measuring device according to claim 6 wherein the receiving branch includes a plurality of diodes for detecting quarter wavelength intervals of the continuous wave electromagnetic signal.

9. The distance-measuring device according to claim 7 comprising a control loop coupled to the oscillator for controlling the frequency of the continuous wave electromagnetic signal.

10. The distance-measuring device according to claim 9, wherein the control loop comprises a phase locked loop (PLL) including at least one frequency divider, one phase discriminator and one low-pass filter and wherein the distance measuring device further comprises a direct digital synthesizer coupled to the phase locked loop for providing an index frequency to the phase locked loop.

11. The distance-measuring device according to claim 9, wherein the control loop comprises at least one frequency counter, a micro-controller and a digital-analog converter for regulation the frequency of the oscillator.

12. The distance-measuring device according to claim 6 wherein the receiving branch includes an in-phase/quadrature detector for detecting in-phase and quadrature components of the reflection of the reflection of the continuous wave electromagnetic signal.

13. A method for measuring a distance, the method comprising:
 (a) feeding a transmission signal into a conductive structure through a coupling probe located within the conductive structure to determine a static position of a reflection means located within the conductive structure for reflecting electromagnetic signals;
 (b) determining a distance between the reflection means and the coupling probe by detecting reflection of the transmission signal from the reflection means using the coupling probe;
 (c) feeding a continuous wave electromagnetic signal into the conductive structure using the coupling probe;
 (d) detecting, using the coupling probe, a standing wave formed by the continuous wave electrometric signal and a reflection of the continuous wave electromagnetic signal from the reflection means; and
 (e) continuously calculating a distance between the coupling probe and the reflection means while the reflection means is moving based on the standing wave.

14. The method according to claim 13 wherein the transmission signal is single mode TEM signal for coaxial structures.

15. The method according to claim 13 wherein the conductive structure forms a waveguide for the transmission and continuous wave electromagnetic signals.

16. The method of claim 13 wherein the conductive structure comprises a cylinder.

17. The method of claim 13 comprising driving the reflection means using a pneumatic linear drive.

18. The method of claim 13 comprising driving the reflection means using a hydraulic linear drive.

19. The distance measuring device of claim 1 wherein the reflection means comprises a piston.

20. The distance measuring device of claim 1 wherein the coupling probe is substantially planar.

21. The method of claim 13 wherein the reflection means comprises a piston.

22. The method of claim 13 comprising moving the piston using a rod attached to the piston and locating the coupling probe within the conductive structure axially symmetrically with respect to the rod.

* * * * *